US005863468A

United States Patent [19]

Czubarow et al.

[11] Patent Number: 5,863,468

[45] Date of Patent: Jan. 26, 1999

[54] PREPARATION OF CALCINED CERAMIC POWDERS

[75] Inventors: Pawel Czubarow, Menlo Park; Mark W. Ellsworth, Union City; Karin M. Kinsman, San Mateo; Eugen L. Kurjatko, Redwood City; Andrew P. Washabaugh, Menlo Park, all of Calif.

[73] Assignee: Raychem Corporation, Menlo Park, Calif.

[21] Appl. No.: 962,606

[22] Filed: Oct. 31, 1997

[51] Int. Cl.[6] .............................. H01B 1/06; H01B 1/08; C01B 31/00

[52] U.S. Cl. .................................... 252/519.5; 252/518.1; 252/521.5; 423/224

[58] Field of Search ............................. 252/518.1, 519.3, 252/519.5, 519.51, 519.52, 519.53, 519.54, 521.5; 423/224, 246, 418.2

[56] References Cited

U.S. PATENT DOCUMENTS

| | | | |
|---|---|---|---|
| 3,473,958 | 10/1969 | Waku | 117/200 |
| 4,103,274 | 7/1978 | Burgess et al. | 338/21 |
| 4,147,911 | 4/1979 | Nishitani | 219/10.55 |
| 4,219,361 | 8/1980 | Sutton et al. | 106/63 |
| 4,311,520 | 1/1982 | Kruesi et al. | 75/80 |
| 4,321,089 | 3/1982 | Kruesi et al. | 75/84.5 |
| 4,324,582 | 4/1982 | Kruesi et al. | 75/1 R |
| 4,505,787 | 3/1985 | Fuller et al. | 204/67 |
| 4,695,695 | 9/1987 | Meek et al. | 219/10.55 M |
| 4,726,991 | 2/1988 | Hyatt et al. | 428/329 |
| 4,880,578 | 11/1989 | Holcombe et al. | 264/26 |
| 4,942,278 | 7/1990 | Sheinberg et al. | 219/10.55 M |
| 4,956,202 | 9/1990 | Kasenga et al. | 427/215 |
| 5,021,293 | 6/1991 | Huang et al. | 428/328 |
| 5,164,130 | 11/1992 | Holcombe et al. | 262/26 |
| 5,219,829 | 6/1993 | Bauer et al. | 505/1 |
| 5,252,267 | 10/1993 | Holcombe et al. | 264/26 |
| 5,310,598 | 5/1994 | Yoshinaka et al. | 428/328 |
| 5,321,223 | 6/1994 | Kimrey Jr. et al. | 219/745 |
| 5,338,911 | 8/1994 | Brandberg et al. | 219/759 |
| 5,343,024 | 8/1994 | Prosise et al. | 219/730 |
| 5,365,042 | 11/1994 | Benoit et al. | 219/686 |
| 5,410,135 | 4/1995 | Pollart et al. | 219/730 |
| 5,525,259 | 6/1996 | Munn et al. | 252/301.4 R |
| 5,720,859 | 2/1998 | Czubarow et al. | 204/157.43 |

FOREIGN PATENT DOCUMENTS

| | | | |
|---|---|---|---|
| 0 005 387 A1 | 11/1979 | European Pat. Off. | H01B 7/10 |
| 2 547 451 | 12/1984 | France | H01B 1/08 |
| WO 89/04379 | 5/1989 | WIPO | C22B 5/10 |
| WO 97/26693 | 7/1997 | WIPO | H02G 15/64 |

OTHER PUBLICATIONS

Achour et al., J. Mater. Sci. Lett., 14 (1995), pp. 1425–1429.

Derwent Abstract WPI 87268159/38 (abstract of JP 62–187180 (1987).

Dai et al., Acta Physico–chimica Sinica, vol. 12, No. 11, pp. 1049–1052 (Nov. 1996).

Cheng et al., Mater. Res. Soc. Symp. Proc., vol. 347, pp. 514–519 (Apr. 1994).

(List continued on next page.)

*Primary Examiner*—Mark Kopec
*Assistant Examiner*—John M. Petruncio
*Attorney, Agent, or Firm*—Yuan Chao; Herbert G. Burkard

[57] ABSTRACT

Calcined ceramic powder is made by blending a precursor powder with a form of carbon such as carbon black and heating the blend in an oxygenated atmosphere. The carbon acts as a separator, preventing coalescence of the percursor powder during the calcining process. The blend is characterized by the presence of interstitial spacing between the particles of the carbon powder and the precursor powder. The carbon is eventually oxidized to carbon dioxide and/or carbon monoxide and volatilizes as such, leaving behind the calcined ceramic powder. In a preferred embodiment, the heating is effected by microwave radiation. The carbon absorbs the microwave radiation, heating up the precursor powder and calcining it to form the ceramic powder. Once all the carbon has been oxidized, no more microwave radiation is absorbed, and the heating stops, making the process self-limiting.

24 Claims, 9 Drawing Sheets

OTHER PUBLICATIONS

Kosuka et al., Ceram. Trans. 21 (Microw.: Theor. Appl. Mater. Process) pp. 387–394 (1991).

Derwent Abstract WPI 94–043693/06 (abstract of DE 4224974 (1994).

Surrett et al. Mat. Res. Symp. Proce. vol. 347, pp. 691–696 (1994).

Mathis et al., Ceram. Trans. 59 (Microw.: Theor. Appl. Mater. Proces.), pp. 533–541 (1995).

Komarneni, Mater. Res. Soc. Symp. Proc. vol. 124, pp. 235–238 (1988).

Ramesh et al., J. Mater. Res. vol. 9, No. 12, pp. 3025–3027 (Dec. 1994).

Xu et al., J. Mater. Res., vol. 10, No. 2, pp. 334–338 (Feb. 1995).

Vaidhyanathan et al, Chem. Mater. 1997, 9, pp. 1196–1200.

Rao et al., Chem. Commun. 1997, p. 1581.

Despres et al., J. Mater. Chem. 1997, 7(9), pp. 1877–1879.

Mechev, Metally (1994), (1), pp. 41–45.

L'vov et al., Izv. Vyssh. Uchebn. Zaved., Chem. Metall. (1988) (9), 10–13.

Mathis et al., First World Congress on Microwave Processing pp. 41–42 (paper XIV–2).

Hench et al., "Principles of Electronic Ceramics," pp. 191–193, 227–229 (John Wiley & Sons 1990).

Landau et al., "Electrodynamics of Continuous Media," 2nd. Ed., vol. 8, pp. 19–25, 39–42 (Pergamon Press 1984).

PREPARATION OF CALCINED CERAMIC POWDERS

BACKGROUND OF THE INVENTION

This invention relates to a method of preparing calcined ceramic powders, in particular a method using microwave radiation as the energy source.

Powdered ceramics have a large number of applications. Varistor powder is added to polymers to make stress-grading materials for high voltage products. See, e.g., WO 97/26693 (1997); FR 2,547,451 (1984) and EP 0,005,387 (1979). Powdered lithium manganese oxide ($LiMn_2O_4$) is used in rechargeable batteries. Powdered phosphors are used in fluorescent lights. Powdered clays find various uses, such as fillers for polymers and thickeners for pastes.

Ceramics are generally prepared by heating (firing) a green body made of a precursor material at a high temperature, between 600° and 1,400° C. One method of obtaining a powdered ceramic is to prepare the ceramic in bulk by firing and then crushing it. This approach is disadvantageous because an extra step is introduced and because crushing may destroy or damage important microstructural characteristics of the ceramic. For instance, the non-linear resistivity of varistor material is attributed to grain boundary effects. Crushing has been found to damage these boundaries, so that the crushed powder does not have the same non-linear resistivity as the bulk material. Bulk heating is energy-inefficient, as heating through a thick body is required.

An alternative is to calcine a precursor powder in a kiln. However, the precursor material may coalesce or fuse together—i.e., sinter—if the process is not performed properly. Processes in which a flux-containing precursor powder is fired, as occurs in the preparation of varistors and phosphors, are especially prone to fusing.

Thus, it is desirable to develop another method of preparing calcined ceramic powders which is more efficient, in terms of energy consumption, capital equipment requirements, and the number of steps required.

BRIEF SUMMARY OF THE INVENTION

The present invention provides a method of preparing a calcined ceramic powder which overcomes the aforementioned disadvantages of the prior art. The method comprises the steps of:

(a) providing a blend comprising between 3 and 95 weight % of carbon powder and between 97 and 5 weight % of a precursor powder, the weight %'s being based on the combined amounts of carbon powder and precursor powder, the relative sizes of the particles of the carbon powder and the precursor powder being such that there is interstitial volume between them; and (b) heating the blend in an oxygenated atmosphere, such that the precursor powder is calcined to ceramic powder, and the carbon powder is oxidized to at least one of carbon dioxide and carbon monoxide.

The invention is advantageous in its simplicity. The carbon black acts as a separator or spacer, preventing the particles of the precursor powder from fusing or coalescing together into larger agglomerations, destroying its powdered nature. Because the carbon powder is consumed and volatilized as its oxidation product carbon dioxide and/or monoxide, it is removed automatically from the blend without the need for interjecting a separation step.

In a preferred embodiment, the heating is effected by irradiating the blend with microwave energy. The carbon powder, which is microwave susceptible, absorbs the microwave energy and is heated thereby. By conduction, the entire blend, including the precursor powder, is heated and the precursor powder is calcined to ceramic powder. Unless the precursor powder or the calcined ceramic powder are themselves microwave susceptible—which usually is not the case—the process is self-limiting: when the carbon black is substantially consumed, the heating stops. This way, thermal runaway (overheating) is prevented. Another advantage of this embodiment is that calcining is effected in a few minutes, compared to the several hours needed for conventional oven calcining. Lastly, the process is more energy-efficient.

BRIEF DESCRIPTION OF THE DRAWING(S)

FIG. 1 shows schematically a method of preparing varistor powder from a porous block or briquette of ceramic precursor powder.

FIGS. 1*a*, 1*b*, and 1*c* illustrate the concept of interstitial volume as applied to the instant invention.

FIGS. 2, 3 and 4 relate to an embodiment in which the ceramic powder is a varistor powder. FIG. 2 shows the weight loss of carbon black over time. FIG. 3 shows X-ray diffraction (XRD) patterns for a varistor powder. FIG. 4 shows the voltage current relationship of varistor powder, in a silicone rubber matrix.

FIGS. 5 and 6 relate to an embodiment in which the ceramic powder is calcined clay. FIG. 5 shows the weight loss of carbon over time. FIG. 6 shows XRD patterns for the calcined clay.

FIGS. 7 and 8 relate to an embodiment in which the ceramic powder is lithium manganese oxide. FIG. 7 shows the weight loss of carbon. FIG. 8 shows the XRD pattern of lithium manganese oxide.

FIGS. 9 and 10 relate to an embodiment in which one form of titanium dioxide (anatase) is converted to another form (rutile).

DETAILED DESCRIPTION OF THE INVENTION

Figure 1:
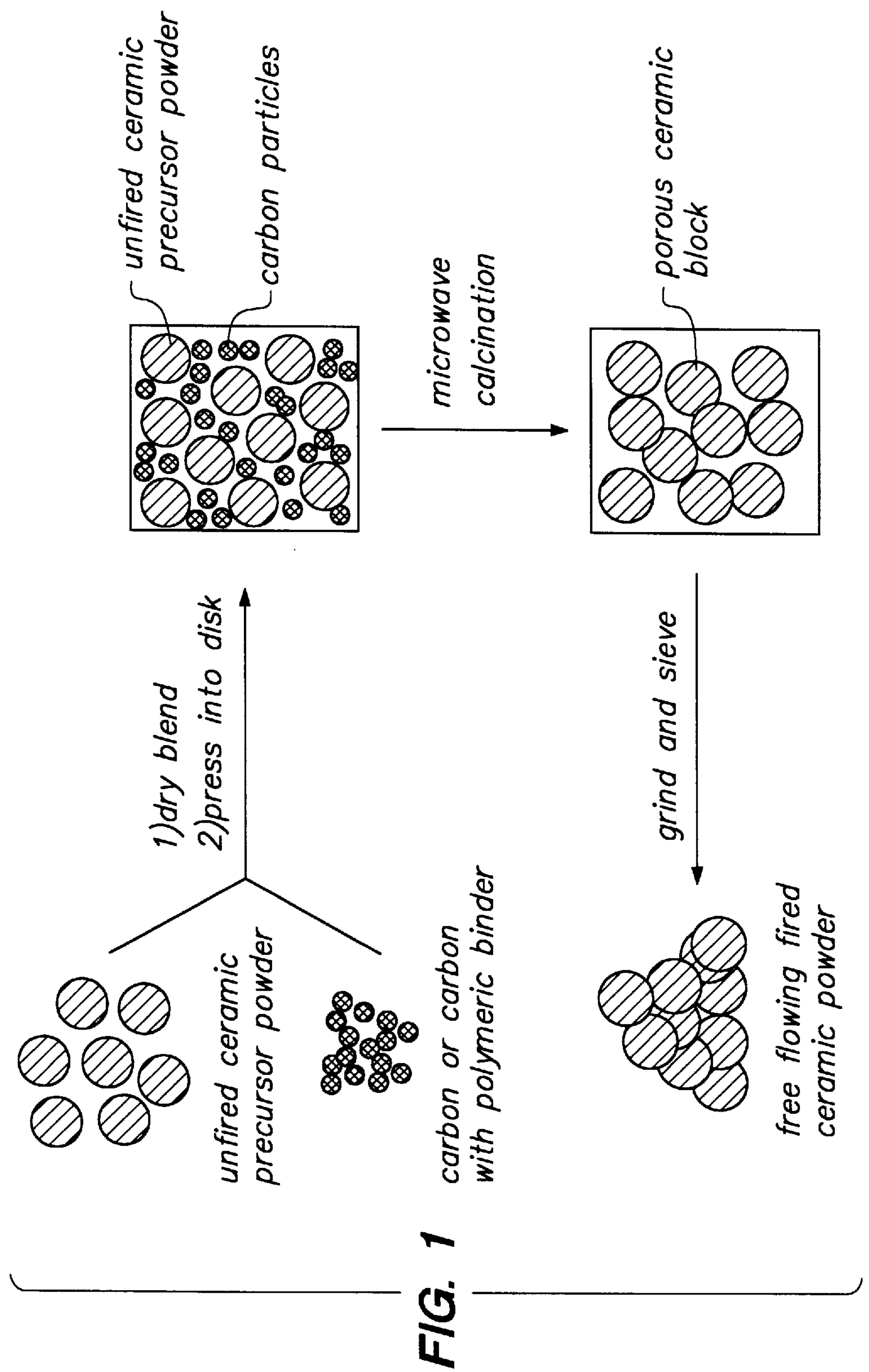

Precursor powders which can be calcined according to this invention include varistor precursor powder, manganese dioxide/lithium carbonate, phosphor precursor powders, titanium dioxide, and clay. Generally, any stable oxide in powder form which is not further oxidized during calcining may be so calcined. Exemplary ceramic powders which can be made include varistors, lithium manganese oxide, phosphors, titanium dioxide, and calcined clay. The particle size of the ceramic powder is not critical to the practice of this invention and is dictated, if at all, by the requirements of the application for which it is ultimately intended. The powders may range in particle size from micron or sub-micron sized powders to coarse, sand-like powders. The terms "precursor powder" and "ceramic powder" as used herein do not imply that these must necessarily be free-flowing powders. The precursor powder (or its blend with carbon) may be in pellet or briquet form, and the resulting pellet or briquet of ceramic powder can be crumbled into free-flowing powder after calcination. It is within the scope of this invention that, during the calcining process, precursor powder particles may fuse with each other at a few isolated bridge points. In fact, once such bridge points are formed, they themselves act as spacers preventing further fusion and complete joining of the bridged particles. The result is the formation of a porous block which can be readily crumbled into the final powder. Since such blocks are more easily handled than the final powder, there is an advantage in keeping the powder in this form until conversion into the final powder is desired. An analogy may be made to postal stamps which are held together as a sheet by perforations, but which may be conveniently separated from each other as needed. This process is illustrated schematically in FIG. 1.

Figure 1A:
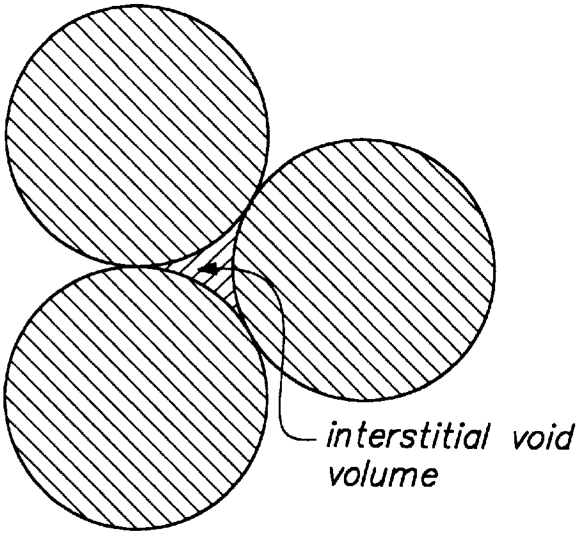
Figure 1B:
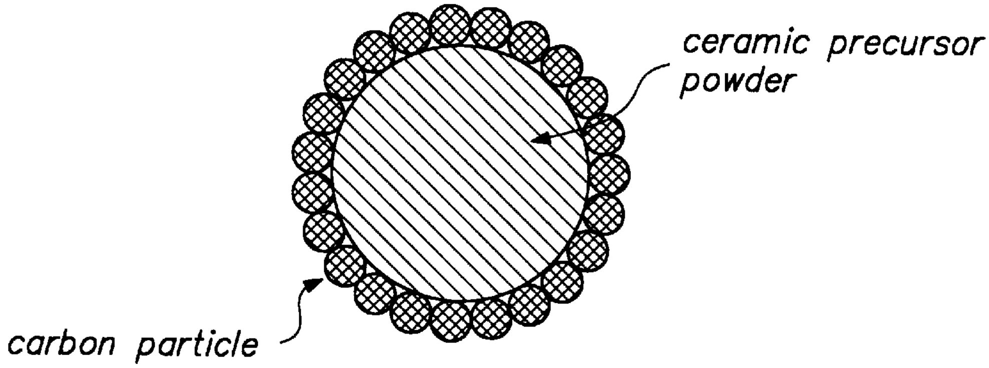
Figure 1C:
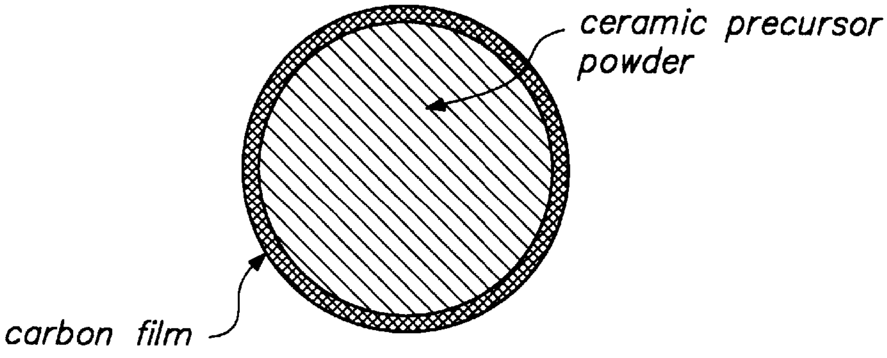

The importance of interstitial volume between the particles of the carbon powder and the precursor powder may be explained as follows. Where it is desired that heating lead to sintering, that is, fusion of the particles to a coherent bonded mass, one should maximize uniform distribution of the carbon and minimize carbon accumulation at triple points of precursor powder particles. Such uniform distribution can be achieved for example by a coating process, in which the carbon or a precursor thereof is coated onto the precursor powder particles. For solid body formation it is desirable to minimize possible origins of interstitial volume (free volume) excess which could be derived from carbon black collecting at triple points of ceramic particles. In general, uniformly packed carbon coated ceramic particles will have less interstitial volume than a blend having substantially the same volume ratio of ceramic to carbon particles. Conversely, for calcining (i.e., heat treating without fusion of the particles) so that the product is a powder, it is desirable to have as much of interstitial volume as possible so that the sintering is inhibited. In the instant invention, the carbon powder particles act in effect like spacer elements. The concept of interstitial volume is illustrated in FIGS. 1*a*, 1*b*, and 1*c*. FIGS. 1*a* and 1*b* depict instances in which interstitial volume according to this invention is present. FIG. 1*b* is noteworthy also in that it illustrates how the relative particle sizes of the precursor powder and the carbon powder need not be about the same; it is possible to have interstitial volume when the precursor powder particle size is larger than the carbon particle size. FIG. 1*c* illustrates an instance not in accordance with this invention, in which the carbon is coated substantially uniformly around the precursor powder particles as a film—i.e., there is no interstitial volume present.

Another parameter which may be relevant is shape or structure of a particle, which influences the power dissipation in the particle through interactions with the high frequency electromagnetic field. For a dielectric particle, when the particle can be considered insulating so that eddy current losses induced by the magnetic component of the applied field can be neglected, the power dissipation is dominated by the dielectric losses associated with the orientation of dipoles by the electric component of the applied field. For the bulk material, when the dielectric polarization is linearly related to the electric field intensity, the time-averaged power dissipated per unit volume $P_d$ can be expressed as $$P_d = 2\pi f \epsilon'' E_{rms}^2$$

where f is the frequency, $\epsilon''$ is the dielectric loss factor and $E_{rms}$ is the rms average electric field intensity. When formed into a particle, the electric field intensity inside the particle will be smaller than the applied field because of a depolarization field inside the particle. The depolarization field is created by the unpaired dielectric dipoles or surface charge at the ends of the particle in the direction of the applied field. These dipoles create an electric field in the direction opposite the applied field, effectively reducing the field intensity inside the particle. The field decreases as the distance between the surface charges increases such that the depolarization fields are smallest in preferred directions inside high aspect ratio or highly structured particles. For example, the field intensity inside a particle $E_i$ is related to the applied field intensity $E_a$ through $$E_i = \frac{E_a}{1 + N(\epsilon_r - 1)}$$

where N is a depolarization factor and $\epsilon_r$ is the permittivity of the particle material relative to the surrounding medium. For a sphere, N=⅓. For a prolate spheroid or a fiber, N<<1 when the field is parallel to the long axis but N~½ for perpendicular fields. For an oblate spheroid or a flat disk, N~1 when the field is parallel to the short axis but N <<1 for perpendicular fields. This indicates that the internal field intensity is nearly equal to the applied field intensity only along preferential directions for the high aspect ratio or highly structured particles. This implies that the highly structured particles will also have greater power dissipation than less structured particles. Thus, it is preferred that the particles of carbon used in this invention have a high aspect ratio, of at least 5:1. Examples of highly structured carbon which have such a high aspect ratio include graphite, nanotubes made from buckyballs and so-called "gypsum flower" carbon, as described in Despres et al., *J Mater. Chem.,* 1997, 7(9), 1877–1879.

Varistor material made by this invention may be a polycrystalline fired ceramic of zinc oxide (the primary metal oxide) containing additionally minor amounts of oxides of other metals (the additive metal oxides) such as $Al_2O_3$, $B_2O_3$, BaO, $Bi_2O_3$, CaO, CoO, $Co_3O_4$, $Cr_2O_3$, FeO, $In_2O_3$, $K_2O$, MgO, $Mn_2O_3$, $Mn_3O_4$, $MnO_2$, NiO, PbO, $Pr_2O_3$, $Sb_2O_3$, $SiO_2$, SnO, $SnO_2$, SrO, $Ta_2O_5$, $TiO_2$, or combinations thereof.

In a preferred method for making varistor precursor powder for use in this invention, soluble salt precursors of the additive metal oxides are converted to the respective oxides and hydroxides in the presence of zinc oxide powder by a precipitant, commonly ammonium hydroxide. Preferably, the additive metal oxides or their precursors are combined with the zinc oxide, and then the precipitant is added to the mixture, although the reversed mixing sequence may also be used. The additive metal oxides precipitate onto or around the zinc oxide, to form a precursor powder which is an intimate mixture of zinc oxide and the additive metal oxides. The precursor powder is collected, and dried, e.g., by spraying. Eda et al., Japanese laid-open application no. 56-101711 (1981) and Thompson et al., U.S. Pat. No. 5,039,452 (1991), the disclosures of which are incorporated herein by reference, disclose suitable precipitation processes.

Although a chemical or compositional change may occur during calcining, the invention is not limited to such instances. It also encompasses instances in which there is only a phase change from one form to another, for example the calcining of titanium dioxide to convert it from the anatase form to the higher temperature rutile form.

The oxygenated atmosphere can be ordinary air, or can be an artificially created one, combining oxygen and other gas(es). For the sake of simplicity and cost-effectiveness, ordinary air is preferred. The oxygenated atmosphere may be a static one, or there may be a constant or intermittent flow of fresh gases.

The blending of the carbon and precursor powders may be accomplished by a number of techiques including tumble blending, Henschell or Waring Blender mixing (i.e. blade mixers), ball milling, slurry or solution blending, etc. The ratio of carbon black to precursor powder may be varied to control the length of time of heating. A higher ratio of carbon black results in longer heating times, as it takes longer for the carbon black to be oxidized away.

The type of carbon dictates the intensity of heating with high structure carbons providing the fastest heat generation and lower structure carbons and graphites providing slower heat generation when a dielectric heating method is employed. Generally, it is preferred that the average particle size of the carbon powder be smaller than the average particle size of the precursor powder.

The carbon can be any one of various forms of microwave susceptible carbon, such as coal, coke, activated charcoal, graphite, glassy carbon (prepared, e.g., by the pyrolysis of sucrose in an inert atmosphere) and carbon black. Carbon black, a generic term for carbonaceous pigments made by the pyrolysis of hydrocarbon gases or oils, is preferred. Carbon black is desirable because it is available in finely divided form of reasonably high purity. Forms of carbon which are less pure and may introduce impurities are less desirable. Among the carbon blacks which may be used are lamp black, bone black, acetylene black, channel black, thermal black, and furnace black. Where the carbon is normally obtained in a non-powder form, it can be ground into powder. Preferred carbon blacks are those referred to as high structure carbon black, which are characterized by a high dibutyl phthalate (DBP) number or a large surface area. Such carbon blacks typically have an average particle size of between about 15 and about 500 nm or a DBP number of between about 120 and about 20.

The blend should have between 3 and 95 weight % carbon and between 97 and 5 weight % precursor powder; preferably between 5 and 50 weight % carbon powder and between 95 and 50 weight % precursor powder; and most preferably between 15 and 25 weight % carbon powder and between 85 and 75 weight % precursor powder. The weight %'s are based on the combined amounts of the carbon powder and the precursor powder.

The material is placed in an oven or kiln (e.g. conventional thermal oven or a microwave device) in either powder or pellet or briquet form and heated until substantially all of the carbon powder is consumed (i.e., oxidized to carbon dioxide and/or carbon monoxide). While it is desirable to consume substantially all the carbon powder (no carbon is apparent in a visual inspection), to avoid the need of a subsequent separation or cleaning-up step, this is not essential. A practitioner may, if he or she so desires, leave some carbon powder behind, for example where the presence of the carbon does not compromise the intended application. The consumption of the carbon can be monitored by various techniques, such as weight loss, X-ray diffraction monitoring (for presence of graphite), or elemental analysis.

Where a thermal oven is used, it may be, for example, a convection oven, a gas oven, an induction heating oven, a tube oven, a tunnel kiln, or a box or muffle furnace. Typical heating regimens are to a temperature of at least 450° C. (needed for effective oxidation of the carbon to carbon dioxide), for a duration of between 30 min and 4 hr.

If microwave heating is employed, the blend may be placed in a conventional microwave oven and held under constant (e.g., 2.45 GHz, 1100 W) or varying microwave power. During the microwave heating, the blend glows orange-red indicating intense heating. The consumption of carbon may be monitored by weighing the sample periodically. Once the carbon is consumed, no more heating occurs and the orange-red glow is no longer observed. Generally, the precursor powder and the calcined ceramic are not microwave susceptible, i.e., they are not absorbers of microwave radiation, so that they do not heat up on their own accord in the absence of the carbon. In some instances a ceramic powder which is not microwave susceptible at ordinary ambient temperatures may be susceptible at elevated temperatures. Then appropriate care should be exercised, for example by staged heating. However, such instances are rare, because the calcining temperatures of this invention often are insufficiently elevated reach the susceptibility temperature. In any event, those skilled in the art will be able to identify such instances and adjust the method accordingly, for example trading off temperature against heating time and by heating in stages. Having the blend (and/or the resulting ceramic powder) loosely packed, or in a loosely agglomerated, easily crumbled briquette, leads to better heat dissipation.

The microwave energy may be applied at a frequency between 0.50 and 90 GHz. Convenient frequencies are 2.45 GHz or 0.915 GHz, which are set aside by the Federal Communications Commission for industrial, scientific, and medical applications. The applied power can range between 10 and 100,000 W. The time of irradiation depends on power applied, sample size, relative proportions of the carbon and ceramic components, and other similar parameters and typically varies between 1 sec and 360 min.

The carbon powder and the ceramic precursor powder may be dispersed in an organic binder for ease of handling. The dispersion may be extruded into a green body having a desired shape (tape, cylinder, etc.). The binder is oxidatively consumed along with the carbon during the calcining step. Examples of suitable binders include polyethylene, polypropylene, other olefinic polymers, poly(propylene glycol), dodecanol, and other binders conventional in the ceramic arts. Typically the binder is used in an amount of 10 to 25 weight %, based on the combined amounts of binder, carbon and precursor powder, but as little as 2 weight % may be used where the green body is formed as a compacted brick. After calcining, the ceramic powder is left behind as a porous, crumbly body which can be readily ground and sieved to appropriately sized free-flowing powder.

The ceramic powders made by this invention find a number of industrial applications. For example, varistor powder can be used as a filler in semiconducting compositions, for stress grading purposes. Lithium manganese oxide can be used in rechargeable batteries. Phosphor powders can be used in fluorescent fixtures.

The invention can be further understood by reference to the following examples, which are provided by way of illustration, not limitation.

EXAMPLE 1

This example describes the preparation of varistor powder by microwave calcination of a varistor precursor powder. Precipitated, spray dried varistor precursor powder (7.5 g, prepared generally according to Thompson et al., U.S. Pat. No. 5,039,452) and furnace black carbon black (2.5 g, Printex 200 from Degussa, a low structure carbon black, with a DBP number of 46) were combined in a plastic jug. The jug was sealed and the powders were tumble blended by shaking the jug for 2 min. The blended powders were pressed into a cylindrical (1 inch diameter by 0.25 inch thick) pellet using a uniaxial hydraulic press at 5,000 psi. The pellet was subjected to microwave radiation (2.45 GHz, 1100 W) for 45 min. The microwave calcined pellet was crushed lightly with a mortar and pestle to yield approximately 7 g of free flowing varistor powder. The electrical performance of the material was characterized by blending 16 g of the microwaved varistor powder with 5 g of RTV silicone rubber. A 2 mm thick disk of the varistor/silicone rubber composite was placed between two brass electrodes to test the voltage-current properties. The composite displayed the expected voltage non-linear behavior similar to that of a solid zinc oxide varistor.

The above synthetic procedure was repeated twice, except that in one repetition the carbon powder used was a high structure carbon black (Lampblack 101, with a DBP number of 112) and in the other repetition graphite was used.

The same procedure was used for microwave calcination of loose powder. The procedure is independent of carbon structure although shorter irradiation times can be employed with high structure carbons.

Figure 2:
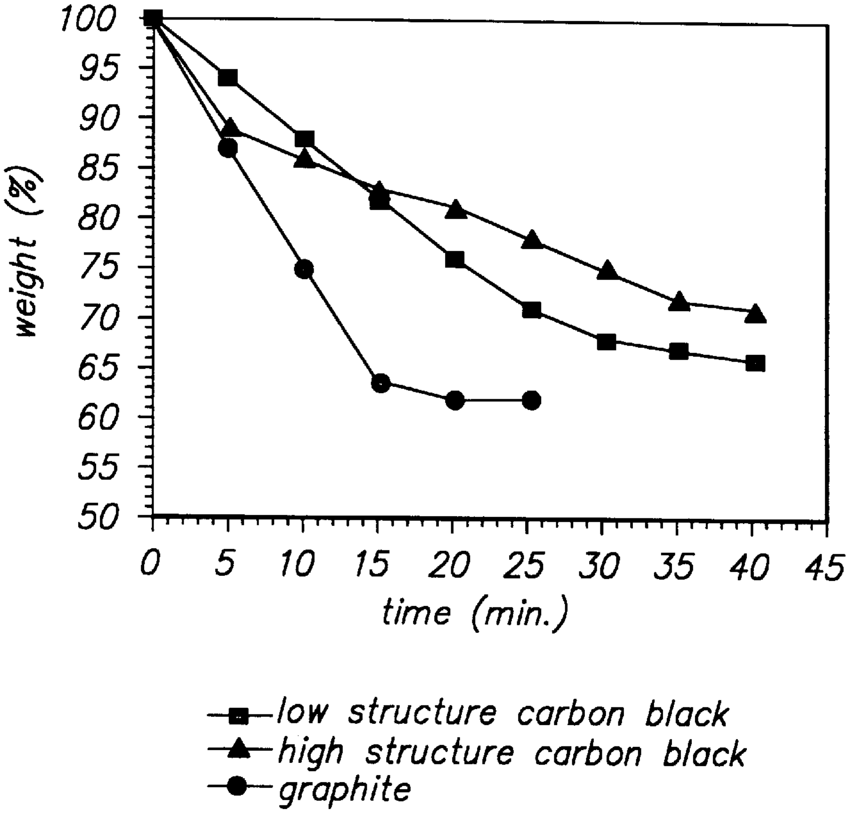
Figure 3:
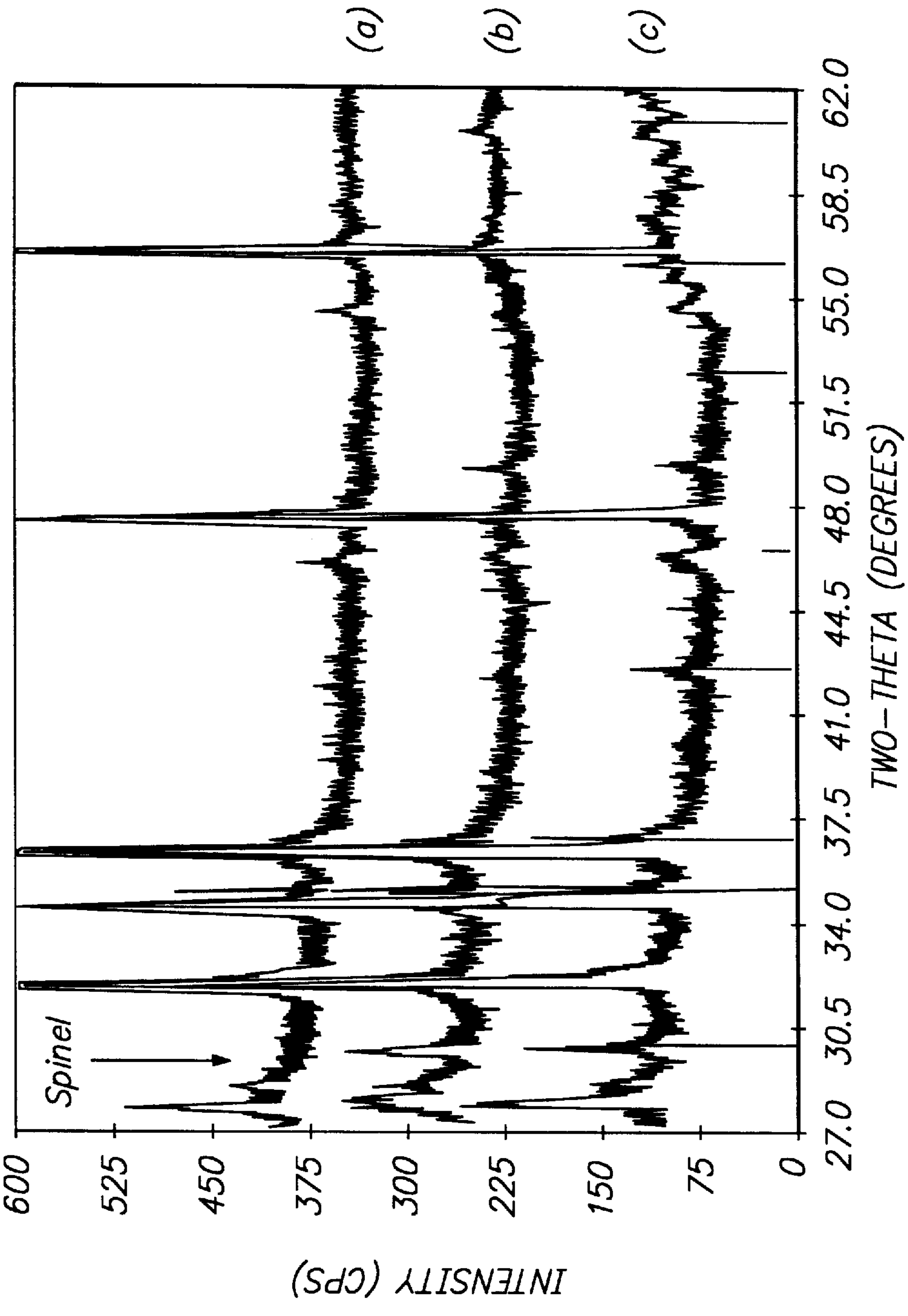
Figure 4:
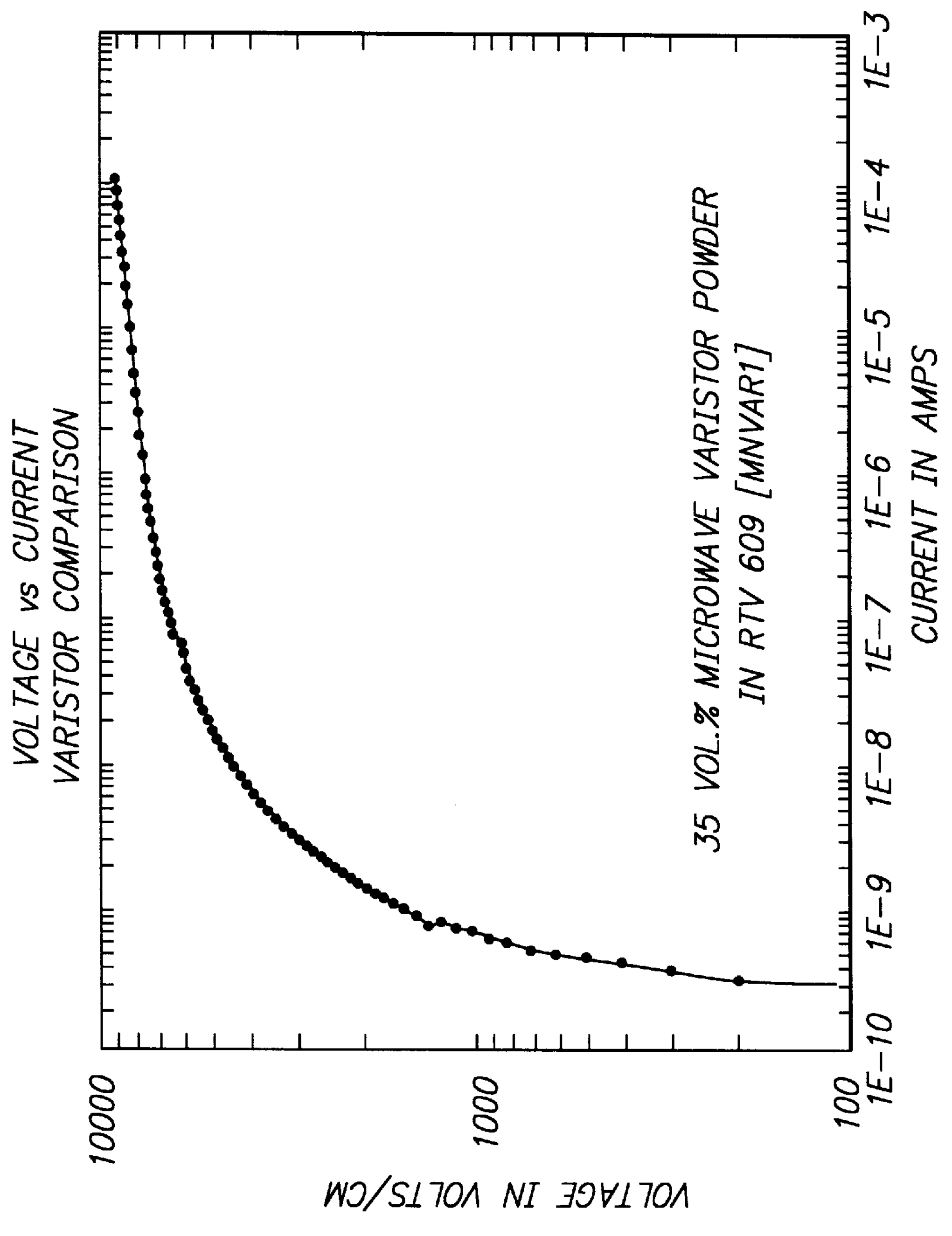

FIG. 2 shows the weight loss of carbon black over time as a function of carbon black structure. The weight loss over time is faster for the high structure carbon indicating more efficient heating. X-ray diffraction was used to characterize the resulting powder by noting the appearance of the zinc-antimony spinel diffraction at about 30 degrees two theta. This peak is not present in the precursor powder. FIG. 3 compares the X-ray diffraction powder patterns for the unfired (precursor) powder blend (trace (a)), the microwave calcined material (trace (b)), and oven calcined material (trace (c)). The markers along the x-axis indicate the position of the JCPDS #15-517 refrence peaks, characteristic of spinel. The formation of spinel in traces (b) and (c) is apparent. FIG. 4 shows the current versus voltage trace of the varistor powder/silicone rubber composite. The varistor characteristics are believed to be superior to those obtained by working with bulk varistor material and then crushing it into a powder. It has been reported to the inventors that varistor powder so produced has undesirably high leakage, possibly due to damage to the grain boundary structure during the crushing process.

EXAMPLE 2

This example discribes the microwave calcination of clay. Huber HG-90 clay (7.5 g) and furnace black carbon black (2.5 g, Printex 200) were blended, pelletized and subjected to microwave radiation as described in Example 1.

Figure 5:
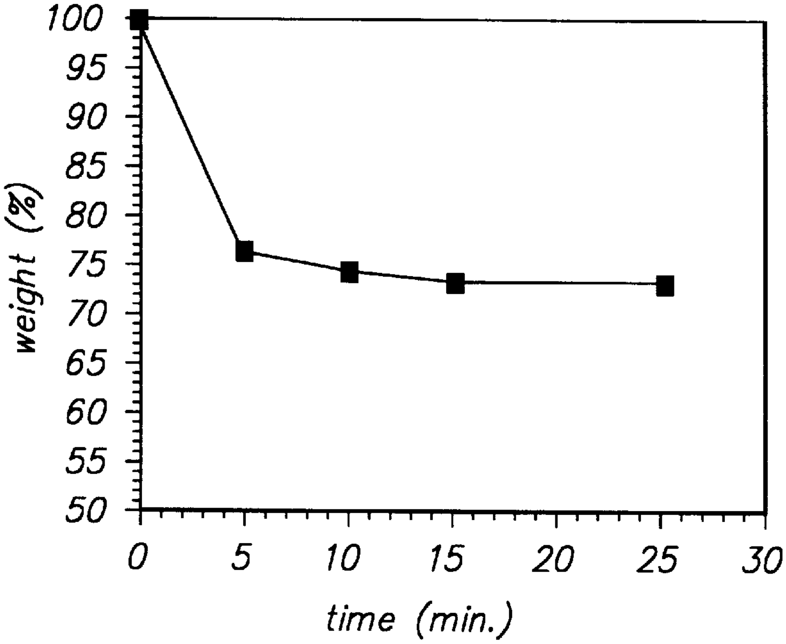
Figure 6:
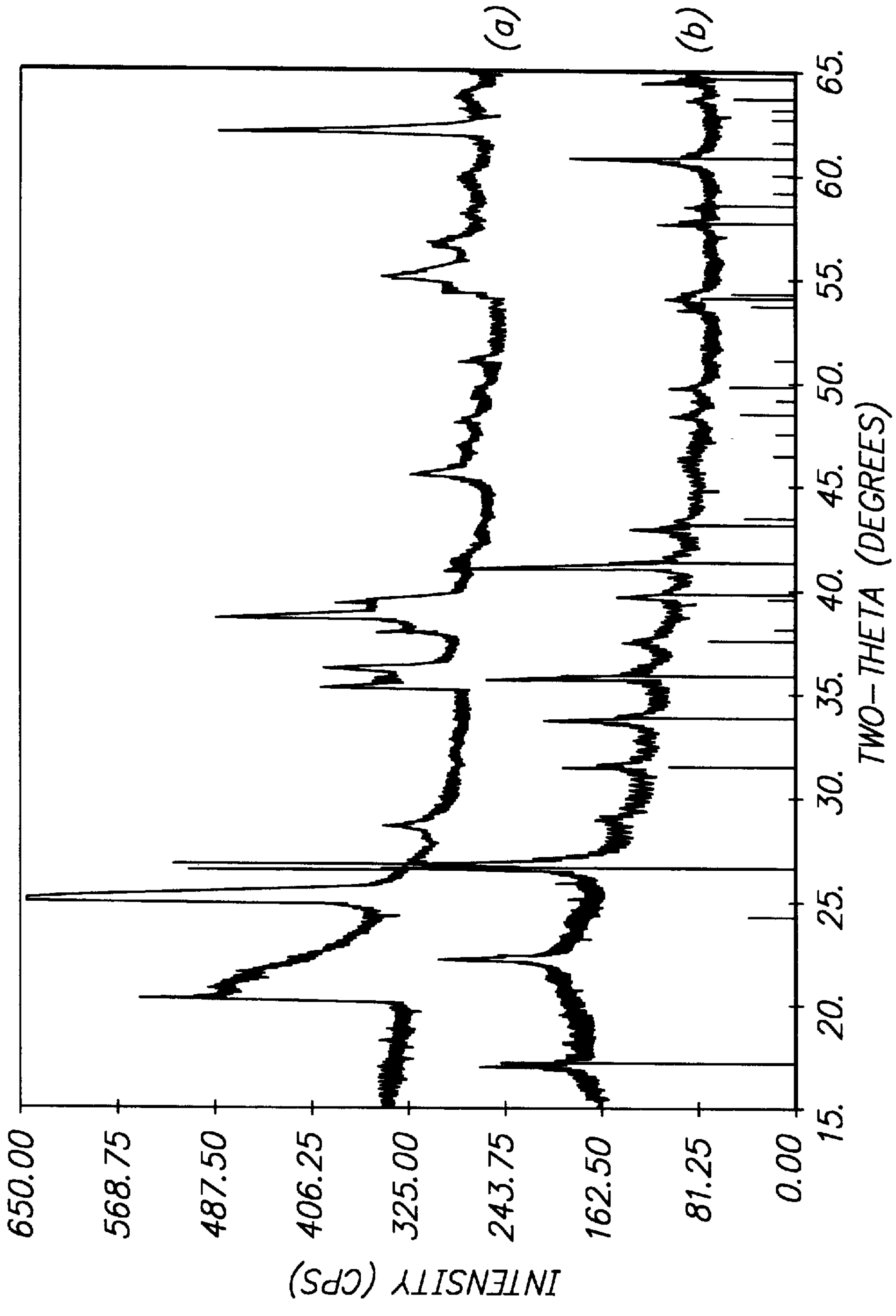

FIG. 5 shows the weight loss of carbon as a function of time. FIG. 6 compares the XRD powder patterns of Huber HG-90 clay, conventional oven calcined clay, and microwave calcined clay. The XRD patterns show the conversion of the HG-90 clay to mullite after calcination, with trace (a) being that of the uncalcined HG-90 clay/carbon blend and trace (b) being that of the calcined material. JCPDS pattern #15-776, characteristic of mullite, is reproduced along the x-axis for reference.

EXAMPLE 3

This example describes the microwave calcination of manganese dioxide/lithium carbonate/carbon black blend to produce lithium manganese oxide. A 1:1 mole ratio blend of manganese dioxide and lithium carbonate (7.5 g) and furnace black carbon black (2.5 g, Printex 200) were blended, pelletized, and subjected to microwave radiation as described in Example 1.

Figure 7:
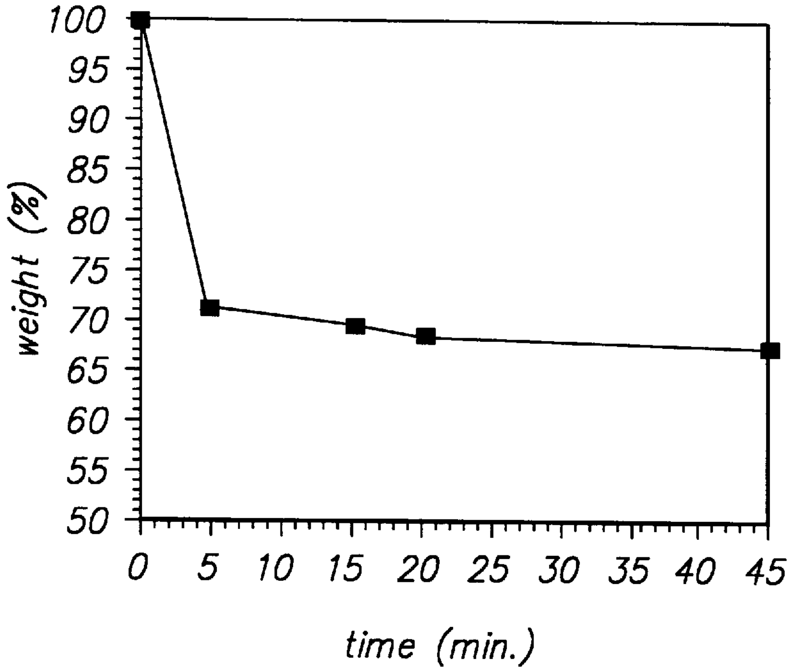
Figure 8:
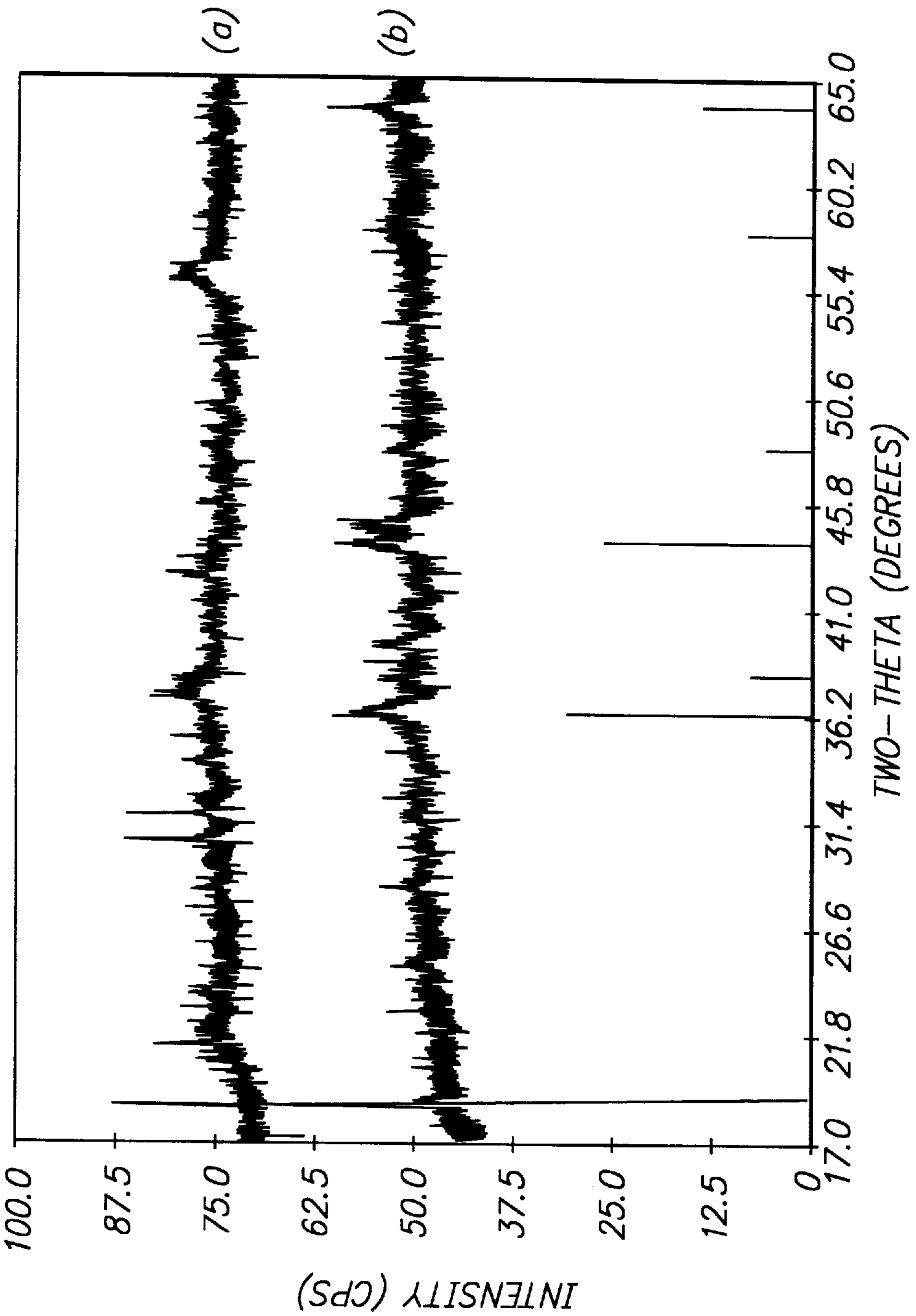

FIG. 7 shows the weight loss of carbon black over time. FIG. 8 shows the X-ray powder patterns for the starting blend and the formation of lithium manganese oxide from that blend. Trace (a) corresponds to an uncalcined blend of manganese dioxide and lithium carbonate, while trace (b) corresponds to lithium manganese oxide made according to this invention. The markers on the x-axis indicate the position of the JCPDS #35-782 peaks characteristic of lithium manganese oxide

EXAMPLE 4

This example describes the formation of varistor powder by microwave calcination from a blend of varistor precursor powder, carbon, and an organic or polymeric binder. Precipitated, spray dried varistor precursor powder (7.5 g), Furnace Black carbon black (2.5 g), and poly(propylene glycol) (1.0 g) were combined in a Waring blender and mixed at 5,000 rpm for 1 min. The mixture was pressed into a pellet and subjected to microwave radiation as described in Example 1. The resulting powder displayed an identical XRD pattern and identical voltage non-linear behavior as the powder from Example 1.

EXAMPLE 5

This example describes the formation of varistor powder from a blend of varistor precursor powder and carbon black using a thermal oven. Precipitated, spray dried varistor precursor powder (7.5 g) and Furnace Black carbon black (2.5 g) were blended and pelletized as described in Example 1. The pellet was heated in a conventional ceramic firing kiln from 50° C. to 1100° C. at a rate of 5 ° C./min., held at 1100° C. for 1 h, and cooled to 50° C. at a rate of 5° C./min. The fired pellet was lightly crushed with a mortar and pestle to yield approximately 7 g of free flowing varistor powder. The resulting powder displayed an identical XRD pattern and identical voltage non-linear behavior as the powder from Example 1.

EXAMPLE 6

This example describes the formation of varistor powder from a blend of varistor precursor powder, carbon black and an organic binder using a conventional thermal oven. Precipitated, spray dried varistor precursor powder (7.5 g), Furnace Black carbon black (2.5 g), and poly(propylene glycol) (1.0 g) were combined in a Waring blender and mixed at 5000 rpm for 1 min. The mixture was pressed into a pellet and fired in a conventional ceramic firing kiln as described in Example 5. The resulting powder displayed an identical XRD pattern and identical voltage non-linear behavior as the powder from Example 1.

EXAMPLE 7

Figure 9:
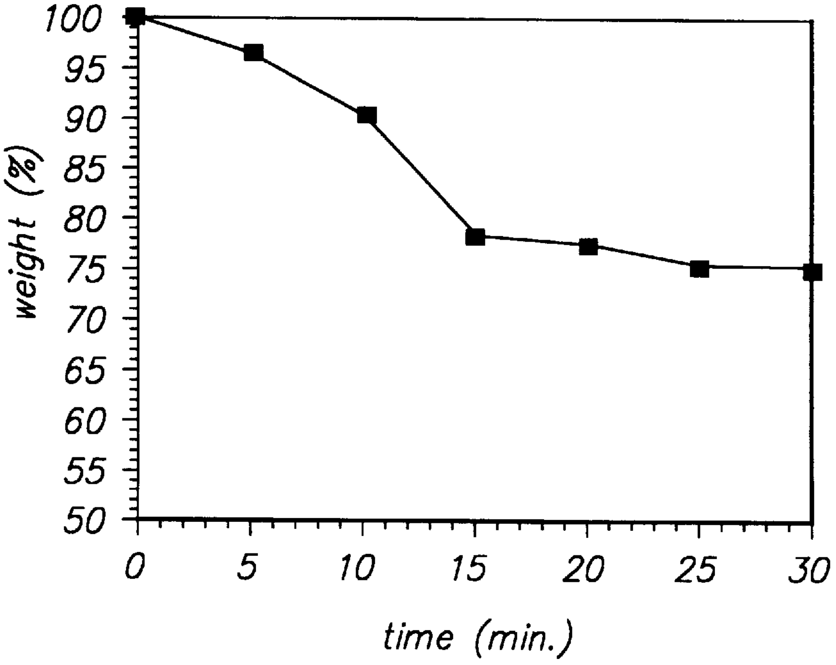
Figure 10:
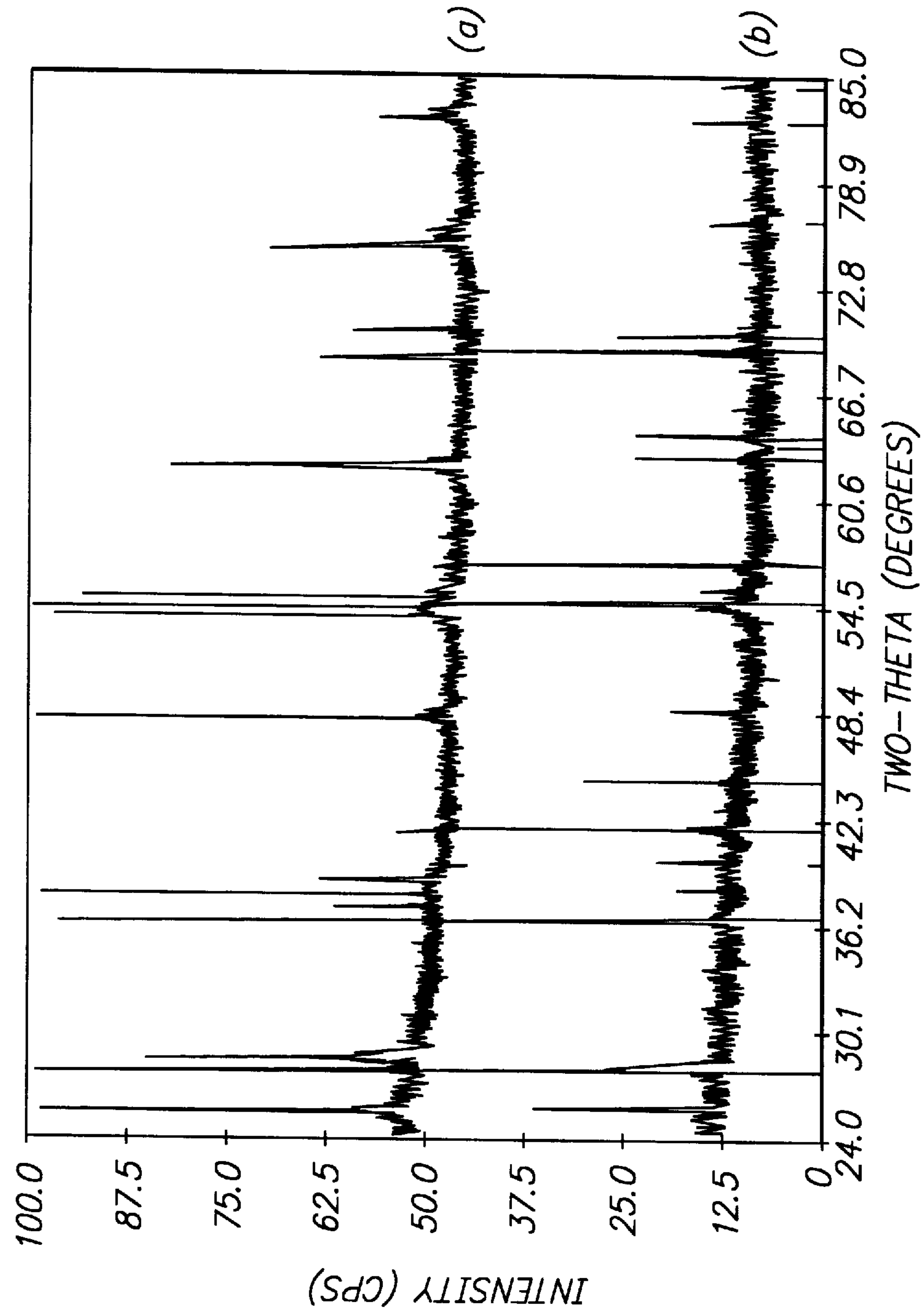

This example describes the conversion of anatase to rutile from a blend of anatase and carbon black using a microwave oven. Anatase (7.5 g, $TiO_2$ from Cerac, Inc.) and furnace black (2.5 g, Printex 200) were blended, pelletized, and subjected to microwave radiation as described in Example 1. FIG. 9 shows the weight loss of carbon black versus time. FIG. 10 shows the conversion of anatase (trace (a)) to rutile (trace (b)). The markers along the x-axis are for JCPDS pattern #21-1276, characteristic of rutile.

The foregoing detailed description of the invention includes passages which are chiefly or exclusively concerned with particular parts or aspects of the invention. It is to be understood that this is for clarity and convenience, that a particular feature may be relevant in more than just the passage in which it is disclosed, and that the disclosure herein includes all the appropriate combinations of information found in the different passages. Similarly, although the various figures and descriptions herein relate to specific embodiments of the invention, it is to be understood that where a specific feature is disclosed in the context of a particular figure or embodiment, such feature can also be used, to the extent appropriate, in the context of another figure or embodiment, in combination with another feature, or in the invention in general.

Further, while the present invention has been particularly described in terms of certain preferred embodiments, the invention is not limited to such preferred embodiments. Rather, the scope of the invention is defined by the appended claims.

What is claimed is:

1. A method of preparing calcined varistor powder, comprising the steps of (a) providing a blend comprising between 3 and 95 weight % of carbon powder and between 97 and 5 weight % of a varistor precursor powder, the weight %'s being based on the combined amounts of carbon powder and varistor precursor powder, the relative sizes of the particles of the carbon powder and the varistor precursor powder being such that there is interstitial volume between them; and (b) heating the blend in an oxygenated atmosphere, such that the varistor precursor powder is calcined to varistor powder, and the carbon powder is oxidized to at least one of carbon dioxide and carbon monoxide.

2. A method according to claim 1, wherein the blend comprises between 5 and 50 weight % of varistor carbon powder and between 95 and 50 weight % of precursor powder.

3. A method according to claim 1, wherein the blend comprises between 15 and 25 weight % of carbon powder and between 85 and 75 weight % of varistor precursor powder.

4. A method according to claim 1, wherein the carbon powder is selected from the group consisting of coal, coke, activated charcoal, graphite, glassy carbon and carbon black.

5. A method according to claim 1, wherein the carbon powder is carbon black.

6. A method according to claim 1, wherein the carbon is high structure carbon.

7. A method according to claim 1, wherein the varistor powder is a polycrystalline ceramic of zinc oxide containing additionally minor amounts of oxides of metals selected from the group consisting of $Al_2O_3$, $B_2O_3$, BaO, $Bi_2O_3$, CaO, CoO, $Co_3O_4$, $Cr_2O_3$, FeO, $In_2O_3$, $K_2O$, MgO, $Mn_2O_3$, $Mn_3O_4$, $MnO_2$, NiO, PbO, $Pr_2O_3$, $Sb_2O_3$, $SiO_2$, SnO, $SnO_2$, SrO, $Ta_2O_5$, $TiO_2$, or combinations thereof.

8. A method according to claim 1, wherein the blend is dispersed in an organic binder.

9. A method according to claim 8, wherein the organic binder is selected from the group consisting of polyethylene, polypropylene, other olefinic polymers, poly(propylene glycol), and dodecanol.

10. A method according to claim 1, wherein the carbon powder is substantially all oxidized to carbon dioxide or carbon monoxide.

11. A method according to claim 1, wherein the average particle size of the carbon powder is smaller than the average particle size of the precursor powder.

12. A method according to claim 1, wherein the heating of the blend is effected by irradiating with microwave energy.

13. A method according to claim 12, wherein the microwave energy is at a frequency between 0.5 and 90 GHz and is applied at a power level between 10 and 100,000 W for a duration of between 1 sec and 360 min.

14. A method according to claim 12, wherein the carbon powder is selected from the group consisting of coal, coke, activated charcoal, graphite, glassy carbon and carbon black.

15. A method according to claim 12, wherein the carbon black is high structure carbon black.

16. A method according to claim 12, wherein the blend is dispersed in an organic binder.

17. A method according to claim 1, wherein the heating of the blend is effected by a thermal oven.

18. A method according to claim 17, wherein the heating of the blend is effected at a temperature of at least 450° C. for a duration of between 30 min and 4 hr.

19. A method according to claim 17, wherein the carbon powder is selected from the group consisting of coal, coke, activated charcoal, graphite, glassy carbon and carbon black.

20. A method according to claim 17, wherein the carbon black is high structure carbon black.

21. A method according to claim 17, wherein the blend is dispersed in an organic binder.

22. A method according to claim 1, wherein the particles in the carbon powder have an aspect ratio of greater than 5:1.

23. A method according to claim 1, wherein the carbon powder is carbon black having an average particle size of between about 15 and about 500 nm.

24. A method according to claim 1, wherein the carbon powder is carbon black having a dibutyl phthalate number of between about 120 and about 20.

* * * * *